(12) United States Patent
Park (10) Patent No.: US 12,476,566 B2
(45) Date of Patent: Nov. 18, 2025

(54) ELECTRONIC CONTROL DEVICE USING SHUNT RESISTOR AND CURRENT DETECTION CIRCUIT

(71) Applicant: HL MANDO CORPORATION, Gyeonggi-do (KR)

(72) Inventor: Jaesang Park, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 29 days.

(21) Appl. No.: 18/388,810

(22) Filed: Nov. 10, 2023

(65) Prior Publication Data

US 2024/0356472 A1    Oct. 24, 2024

(30) Foreign Application Priority Data

Apr. 19, 2023    (KR) .................. 10-2023-0051420

(51) Int. Cl.
| | | |
|---|---|---|
| *H02P 23/14* | (2006.01) | |
| *B60R 16/033* | (2006.01) | |
| *B62D 5/04* | (2006.01) | |
| *H02P 27/08* | (2006.01) | |

(52) U.S. Cl.
CPC ............ *H02P 23/14* (2013.01); *B60R 16/033* (2013.01); *B62D 5/046* (2013.01); *H02P 27/08* (2013.01)

(58) Field of Classification Search
CPC ...... H02P 27/06; H02P 27/04; H02P 2209/05; H02P 2207/05; H02P 2205/01; H02P 2205/05; H02P 2101/45; H02P 25/022; H02P 25/03; H02P 25/062; H02P 6/28; H02P 1/42; H02P 1/46; H02P 27/08; H02P 7/285; B62D 5/046; B62D 5/0481; G01R 15/04; G01R 15/146; H02M 1/0009

See application file for complete search history.

(56) References Cited

U.S. PATENT DOCUMENTS

| | | | |
|---|---|---|---|
| 2013/0158808 A1* | 6/2013 | Imamura | B62D 5/046 |
| | | | 701/42 |
| 2014/0077741 A1 | 3/2014 | Kumagai et al. | |
| 2022/0149766 A1 | 5/2022 | Park | |

FOREIGN PATENT DOCUMENTS

| | | |
|---|---|---|
| JP | 2006-64596 | 3/2006 |
| JP | 2013-110864 | 6/2013 |
| JP | 2020-202615 | 12/2020 |
| KR | 10-2004-0050777 | 6/2004 |
| KR | 10-2020-0009728 | 1/2020 |
| KR | 10-2022-0064050 | 5/2022 |

OTHER PUBLICATIONS

Office Action dated Sep. 2, 2025 for Korean Patent Application No. 10-2023-0051420 and its English translation provided by Applicant's foreign counsel.

* cited by examiner

*Primary Examiner* — Antony M Paul
(74) *Attorney, Agent, or Firm* — WOMBLE BOND DICKINSON (US) LLP (57) ABSTRACT

According to present embodiments, it is possible to accurately control an inverter by determining a steering assist current value from a steering assist voltage value based on an input/output relational expression of an operational amplifier and a resistance values of the shunt resistor and a parasitic resistor.

10 Claims, 11 Drawing Sheets

ELECTRONIC CONTROL DEVICE USING SHUNT RESISTOR AND CURRENT DETECTION CIRCUIT

CROSS REFERENCE TO RELATED APPLICATION

This application claims priority from Korean Patent Application No. 10-2023-0051420, filed on Apr. 19, 2023, which is hereby incorporated by reference for all purposes as if fully set forth herein.

TECHNICAL FIELD

An embodiment of the present disclosure relates to an electronic control device using a shunt resistor and a current detection circuit.

BACKGROUND

In an electronic steering device, a steering torque according to the driver's steering wheel manipulation is detected by a torque sensor, and steering torque information transmitted to a controller (ECU). The controller (ECU) may determine the driver's steering intention according to the steering torque and provide a steering assist force for assisting the steering. That is, in the electric steering system, the ECU may control a steering motor according to the driving conditions of the vehicle detected by a vehicle speed sensor and a torque sensor, provide the optimal steering conditions to the driver by providing a light and comfortable steering feeling during low-speed driving, providing a good directional stability along with heavy steering feeling during high-speed driving, and providing a rapid steering in an emergency situation In this case, an electric steering device may detect a steering assist current flowing through the steering motor and transfers information thereon to the controller (ECU), and the controller (ECU) may compare a driving current supplied to the steering motor with an actual steering assist current flowing the actual steering motor so as to precisely control the steering motor.

However, in the case that an error value between the driving current and the steering assist current is large, the control of the steering motor may be not precise, so that there may be a problem in that a steering torque unintended by a driver is generated or vibration is generated when the driver operates a steering wheel.

SUMMARY

Embodiments of the present disclosure is to provide an electronic control device using a shunt resistor and a current detection circuit capable of accurately controlling an inverter by determining a steering assist current value from a steering assist voltage value based on an input/output relational expression of an operational amplifier and a resistance values of the shunt resistor and a parasitic resistor.

In accordance with an aspect of the present disclosure, there is provided an electronic control device using a shunt resistor and a current detection circuit including an inverter configured to convert electric energy of a battery to provide a steering assist current I to a steering motor, a shunt resistor Rs connected between the inverter and a ground to form a steering assist voltage V corresponding to the steering assist current I, a current detection circuit including an operational amplifier for amplifying and outputting the steering assist voltage V and a parasitic resistor Rg generated between the shunt resistor Rs and the ground, and a controller configured to convert a steering assist voltage value Vout amplified by the current detection circuit into a steering assist current value Imotor and control the inverter by using a driving signal output according to the converted steering assist current value Imotor, wherein the controller is configured to determine the steering assist current value Imotor from the steering assist voltage value Vout based on an input/output relational expression of the operational amplifier and resistance values of the shunt resistor Rs and the parasitic resistor Rg.

In addition, the controller may determine the steering assist current value Imotor from the steering assist voltage value Vout according to the resistance value of the parasitic resistor Rg, which is preset based on a parameter value.

In addition, the current detection circuit may include a first resistor R2 connected between one end of the shunt resistor Rs and a positive input terminal Vop+ of the operational amplifier.

In addition, the current detection circuit may include a second resistor R0 connected between the positive input terminal Vop+ of the operational amplifier and a power supply voltage Vcc.

In addition, the current detection circuit may include a first voltage distribution resistor Rd1 connected between the second resistor R0 and the power supply voltage Vcc.

In addition, the current detection circuit may include a second voltage distribution resistor Rd2 connected between the second resistor R0 and the ground.

In addition, the current detection circuit may include a third resistor R1 connected between the other end of the shunt resistor Rs and a negative input terminal Vop− of the operational amplifier.

In addition, the current detection circuit may include a fourth resistor Rf connected between the negative input terminal Vop− and an output terminal Vout of the operational amplifier.

In addition, the current detection circuit may include a buffer connected between the second resistor R0 and the first voltage distribution resistor Rd1 and the second voltage distribution resistor Rd2.

In addition, the controller may determine the steering assist current value from the steering assist voltage value by using the following equation.

$$V_o = R_{d2} \frac{(R_s + R_g + R_o + R_2)V_{cc} + R_{d1}(R_s + R_g)I_{motor}}{(R_s + R_g + R_o + R_2)(R_{d1} + R_{d2}) + R_{d1}R_{d2}}$$

$$V_{out} = \frac{R_1 + R_f}{R_1(R_o + R_2)}\left\{\left(R_o(R_s + R_g) - \frac{(R_s + R_g)^2 R_o}{R_s + R_g + R_o + R_2}\right)I_{motor} + \left(R_2 + \frac{R_o(R_s + R_g)}{R_s + R_g + R_o + R_2}\right)V_o\right\} - \frac{R_f R_g}{R_1}\left(I_{motor} - \frac{(R_s + R_g)I_{motor} - V_o}{R_s + R_g + R_o + R_2}\right)$$

According to an embodiment of the present disclosure, it is possible to provide an electronic control device using a shunt resistor and a current detection circuit capable of accurately controlling an inverter by determining a steering assist current value from a steering assist voltage value based on an input/output relational expression of an operational amplifier and a resistance values of the shunt resistor and a parasitic resistor.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
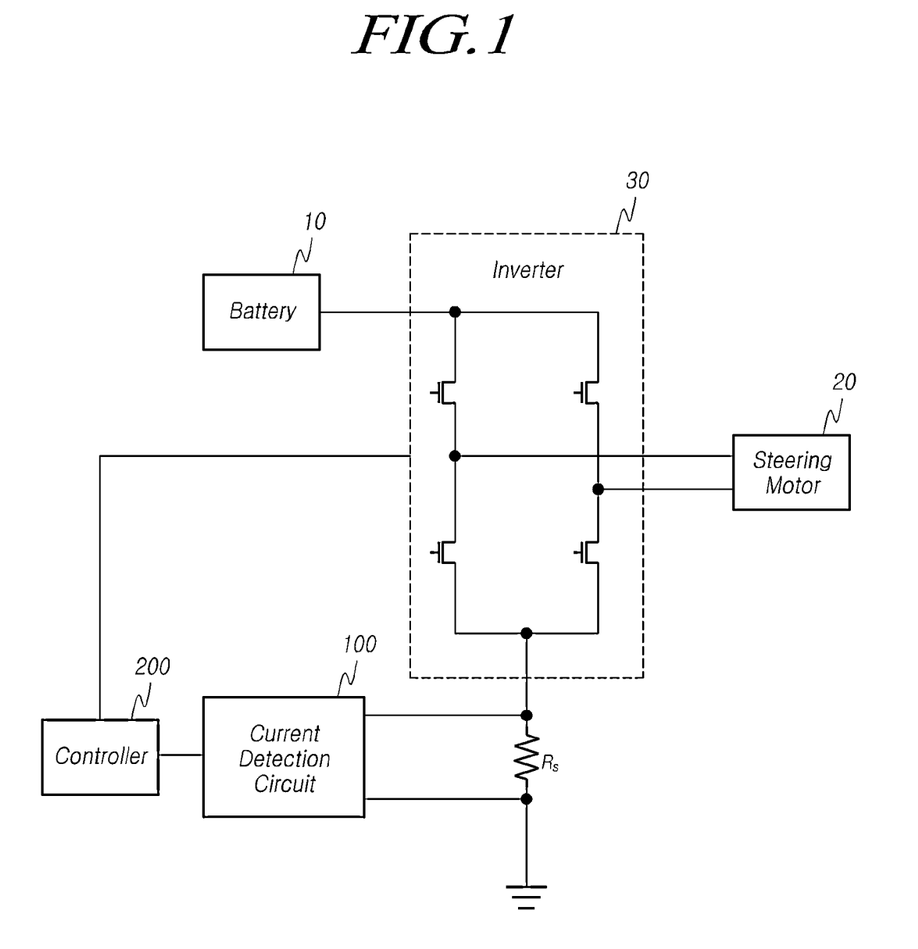
FIGS. 1 and 2 illustrate a block diagram of an electronic control device using a shunt resistor and a current detection circuit according to the present embodiments.
Figure 2:
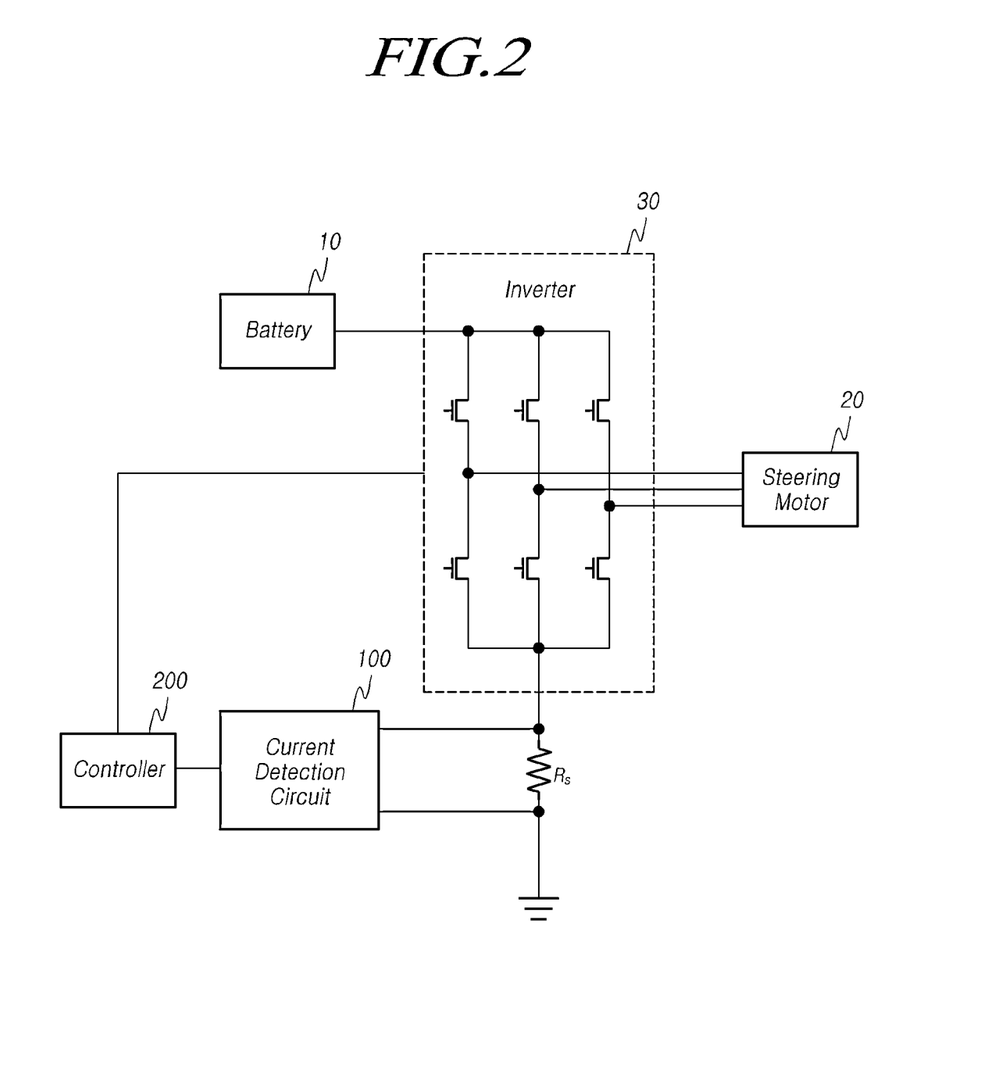
Figure 3:
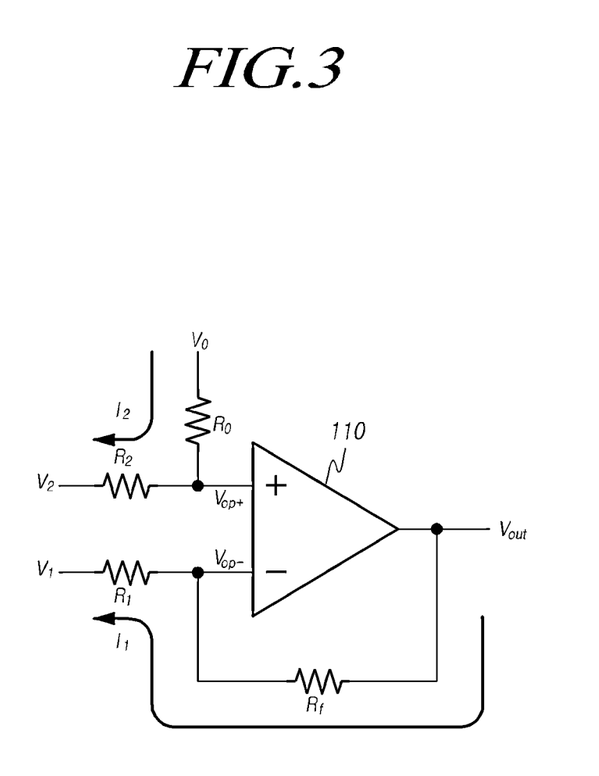
FIGS. 3 and 4 are circuit diagrams illustrating a part of a current detection circuit according to the present embodiments.
Figure 4:
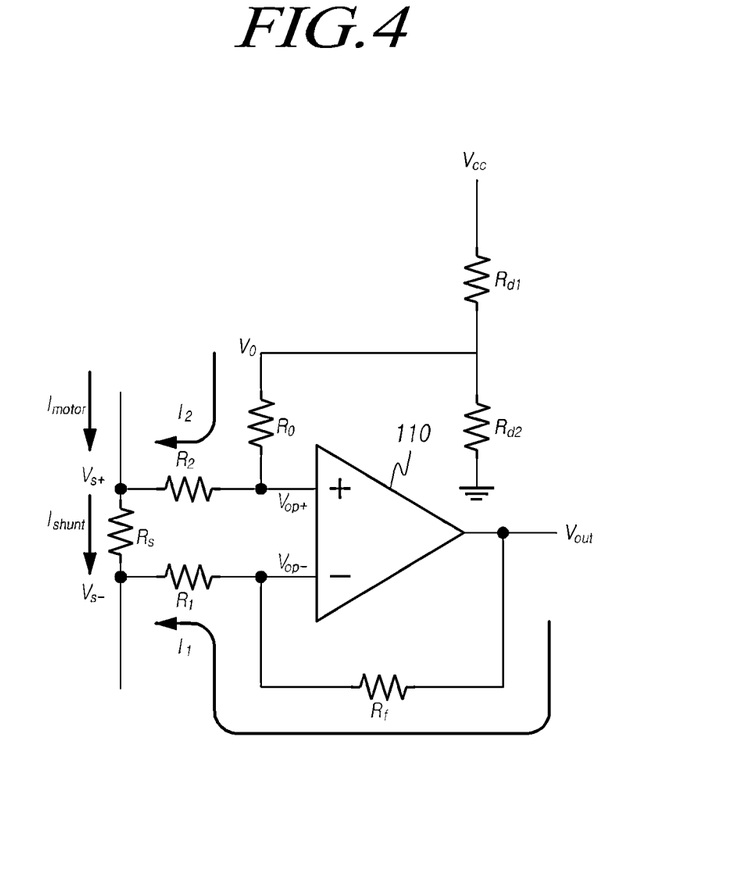
Figure 5:
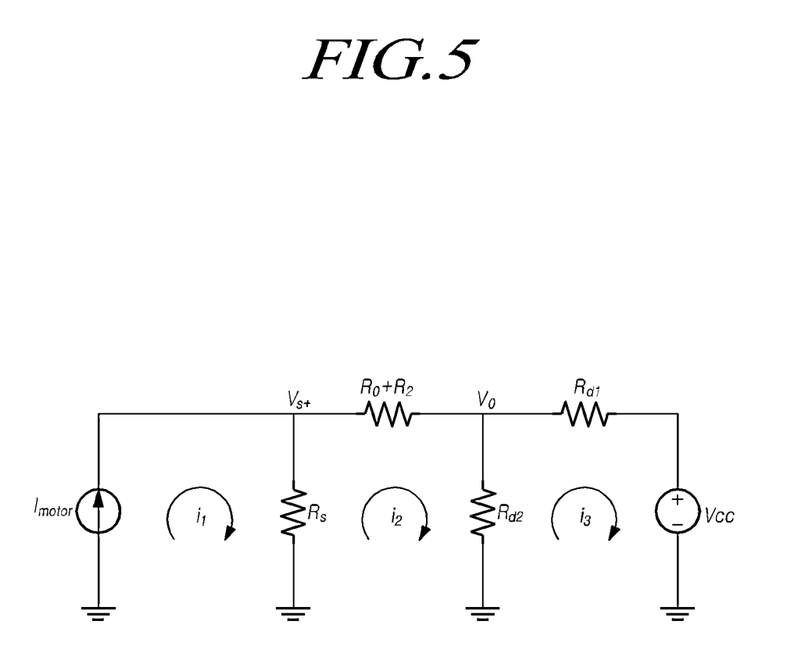
FIG. 5 is an effective circuit diagram of an offset voltage stage of a current detection circuit according to the present embodiments.
Figure 6:
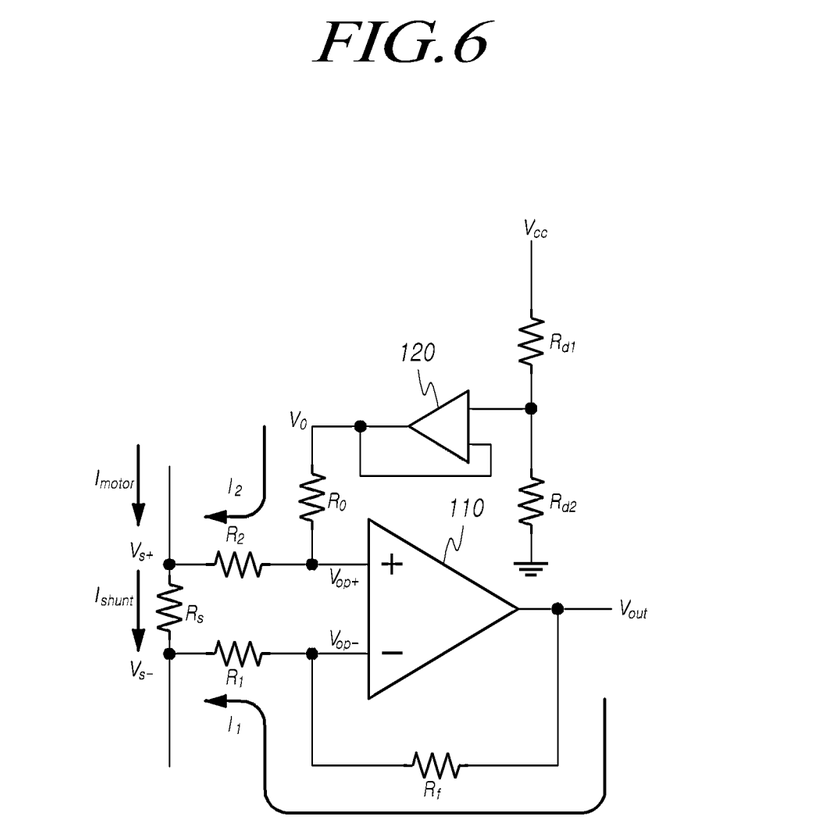
FIG. 6 is a circuit diagram in which a buffer is applied to an offset voltage of a current detection circuit according to the present embodiments.
Figure 7:
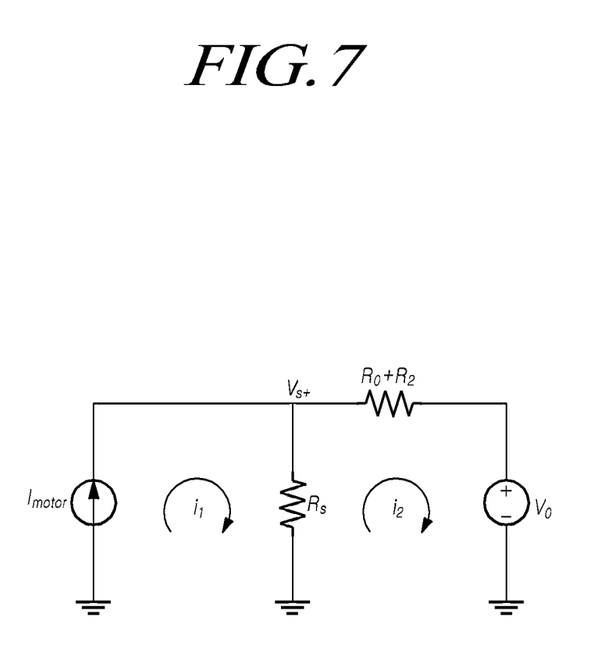
FIG. 7 is an effective circuit diagram of an offset voltage stage separating up to a second resistor of a current detection circuit according to the present embodiments.
Figure 8:
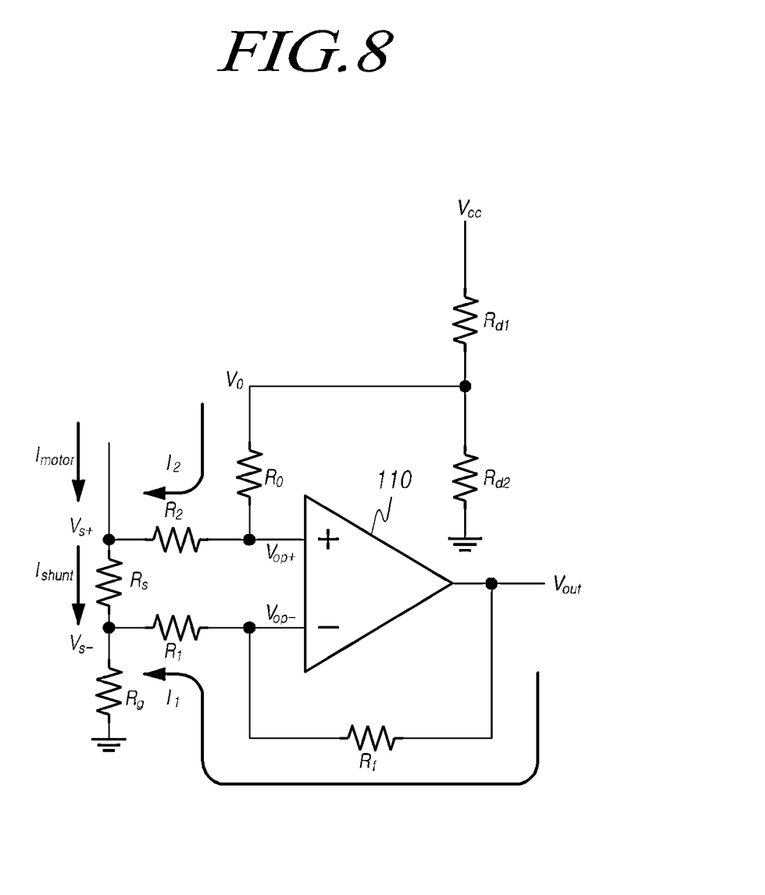
FIG. 8 is a circuit diagram in which parasitic resistor is applied to a current detection circuit according to the present embodiments.
Figure 9:
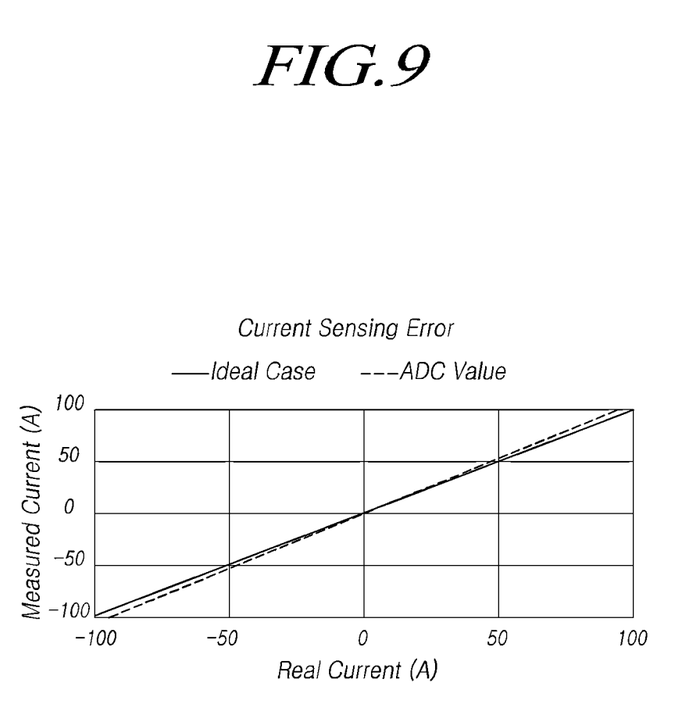
FIG. 9 is a graph illustrating the sensing errors due to parasitic resistance of a current detection circuit according to the present embodiments.
Figure 10:
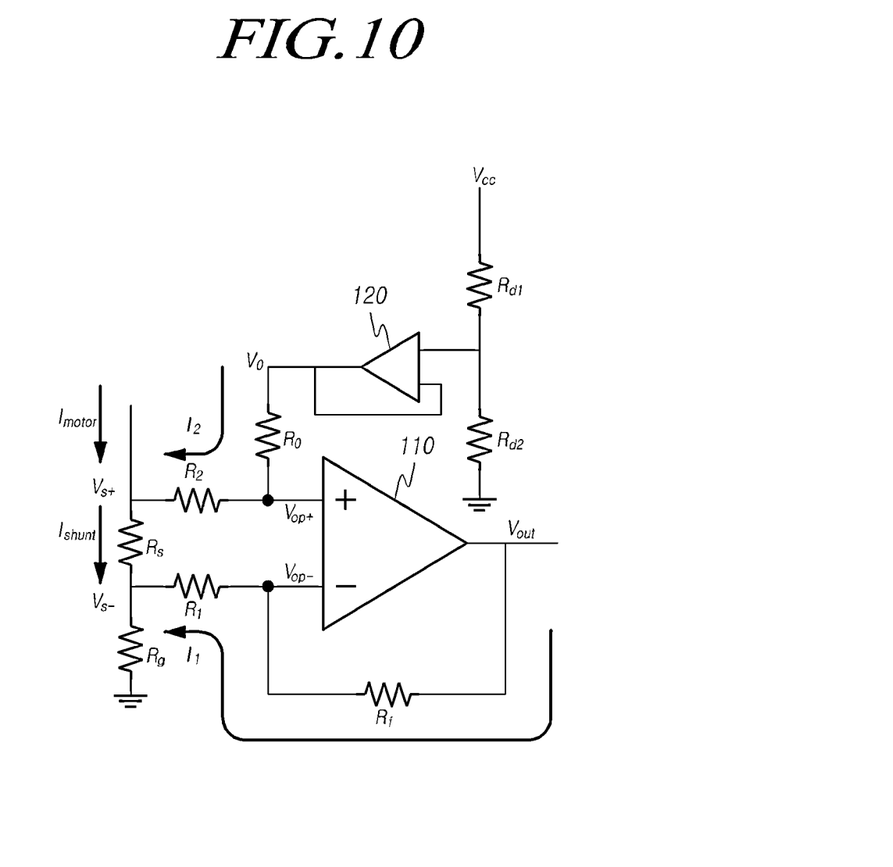
FIG. 10 is a circuit diagram in which a parasitic resistor is applied to a current detection circuit and a buffer is applied to an offset voltage according to the present embodiments.
Figure 11:
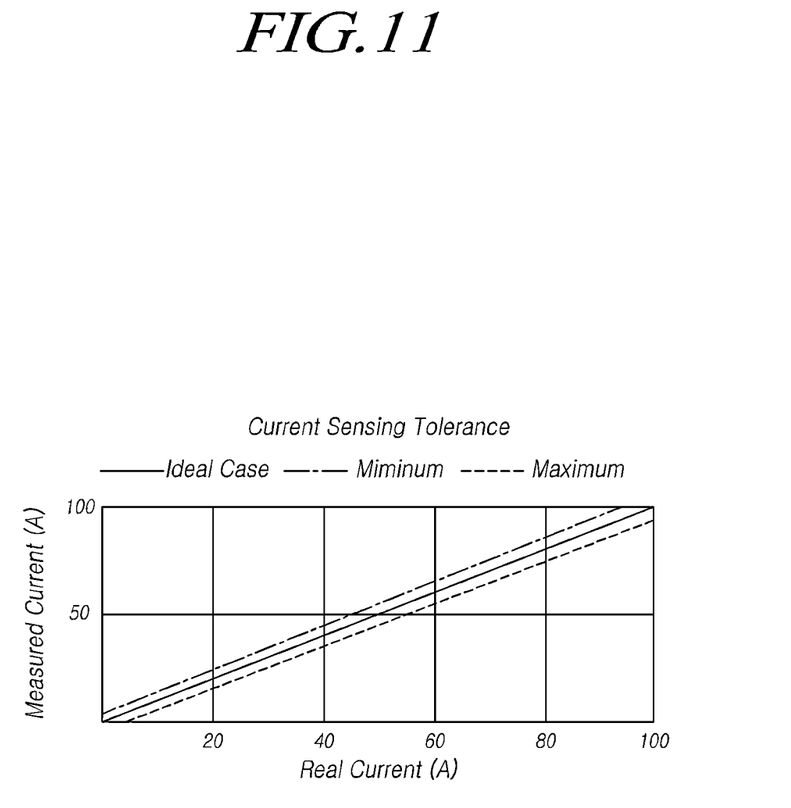
FIG. 11 is a graph illustrating the sensing tolerance due to element distribution of a current detection circuit according to the present embodiments.

FIGS. 1 and 2 illustrate a block diagram of an electronic control device using a shunt resistor and a current detection circuit according to the present embodiments. FIGS. 3 and 4 are circuit diagrams illustrating a part of a current detection circuit according to the present embodiments. FIG. 5 is an effective circuit diagram of an offset voltage stage of a current detection circuit according to the present embodiments. FIG. 6 is a circuit diagram in which a buffer is applied to an offset voltage of a current detection circuit according to the present embodiments. FIG. 7 is an effective circuit diagram of an offset voltage stage separating up to a second resistor of a current detection circuit according to the present embodiments. FIG. 8 is a circuit diagram in which parasitic resistor is applied to a current detection circuit according to the present embodiments. FIG. 9 is a graph illustrating the sensing errors due to parasitic resistance of a current detection circuit according to the present embodiments. FIG. 10 is a circuit diagram in which a parasitic resistor is applied to a current detection circuit and a buffer is applied to an offset voltage according to the present embodiments. FIG. 11 is a graph illustrating the sensing tolerance due to element distribution of a current detection circuit according to the present embodiments.

A combination of a shunt resistor Rs and an operational amplifier 110 used as a current measurement method for various electronic devices may be not a problem in an ideal circuit. When used, errors occur due to the distribution of the shunt resistor Rs or the distribution and parasitic components of peripheral circuits constituting the operational amplifier 110. However, in the case that a basic input/output relational expression of the operational amplifier 110 is used in an actual product, there may occur an error due to a distribution of the shunt resistance Rs, a distribution of peripheral circuits constituting the operational amplifier 110, and parasitic components.

Since the measured current value may return a value different from a real current value, when the current is measured for control, the control performance of the entire system may be degraded.

Accordingly, in an electronic control device using a current detection circuit 100 of the present embodiment, a controller 200 may determine a steering assist current value Imotor from a steering assist voltage value Vout based on an input/output relational expression of the operational amplifier and resistance values of a shunt resistor Rs and a parasitic resistor Rg.

An electronic control device using a shunt resistor and a current detection circuit according to the present embodiments may include, an inverter 30 for converting electric energy of a battery 10 to provide a steering assist current I to a steering motor 20; a shunt resistor Rs connected between the inverter 30 and a ground to form a steering assist voltage V corresponding to the steering assist current I; a current detection circuit 100 including an operational amplifier 110 for amplifying and outputting the steering assist voltage V and a parasitic resistor Rg generated between the shunt resistor Rs and the ground; and a controller 200 for converting a steering assist voltage value Vout amplified by the current detection circuit 100 into a steering assist current value Imotor and controlling the inverter 30 by using a driving signal output according to the converted steering assist current value Imotor. The controller 200 may determine the steering assist current value Imotor from the steering assist voltage value Vout based on an input/output relational expression of the operational amplifier 110 and resistance values of the shunt resistor Rs and the parasitic resistor Rg.

Referring to FIGS. 1 and 2, the electronic control device using a shunt resistor and a current detection circuit according to the present embodiments may include a battery 10, a steering motor 20, an inverter 30, a shunt resistor Rs, a current detection circuit 100, and a controller 200.

Referring to FIG. 1 applied to a two-phase motor and FIG. 2 applied to a three-phase motor, the battery 10 may provide electrical energy to the inverter 30, and the inverter 30 may convert the electrical energy of the battery 10 to provide steering assist current I to the steering motor 20, and the steering motor 20 may assist a steering force so as for the driver to optimally control an operating force of the steering wheel.

The shunt resistor Rs may be connected in series between the inverter 30 and the ground to form a steering assist voltage V corresponding to a steering assist current I.

The current detection circuit 100 may include an operational amplifier 110 which amplifies and outputs the steering assist voltage V, and a parasitic resistor Rg generated between the shunt resistor Rs and the ground.

In addition, the current detection circuit 100 may include at least one of a first resistor R2 connected between one end of the shunt resistor Rs and a positive input terminal Vop+ of the operational amplifier 110; a second resistor R0 connected between the positive input terminal Vop+ of the operational amplifier 110 and the power supply voltage Vcc; a first voltage distribution resistor Rd1 connected between the second resistor R0 and the power supply voltage Vcc; a second voltage distribution resistor Rd2 connected between the second resistor R0 and the ground; a third resistor R1 connected between the other end of the shunt resistor Rs and a negative input terminal Vop– of the operational amplifier 110; and a fourth resistor Rf connected between the negative input terminal Vop– and an output terminal Vout of the operational amplifier 110.

The values of the first to fourth resistors R0, R1, R2, and Rf may set a gain, and the first resistor R2 and the third resistor R1, and the second resistor R0 and the fourth resistor Rf may be symmetrical. In addition, the gain may be determined by a ratio of the fourth resistor Rf to the third resistor R1 and the second resistor R0 to the first resistor R2.

The first voltage distribution resistor Rd1 and the second voltage distribution resistor Rd2 may be resistors having the same or different resistance values, and may divide the power supply voltage Vcc and supply the power supply voltage Vcc across the first voltage distribution resistor Rd1 to the second resistor R0.

In addition, the current detection circuit 100 may further include a buffer 120 connected between the second resistor R0 and the first voltage distribution resistor Rd1 and the second voltage distribution resistor Rd2.

The buffer 120 may be formed of an operational amplifier having an amplification ratio of 0, and may be connected between the second resistor R0 and the first voltage distribution resistor Rd1 and the second voltage distribution resistor Rd2 to prevent current from flowing from a current measuring unit to an offset voltage distribution stage.

The controller 200 may convert the steering assist voltage value Vout amplified by the current detection circuit 100 into a steering assist current value Imotor, and control the inverter 30 with a PWM driving signal output according to the converted steering assist current value Imotor.

Here, the controller 200 may determine the steering assist current value Imotor from the steering assist voltage value Vout based on an input/output relational expression of the operational amplifier 110 and the resistance values of the shunt resistor Rs and the parasitic resistor Rg.

In this case, the controller 200 may determine the steering assist current value Imotor from the steering assist voltage value Vout according to the resistance value of the parasitic resistor Rg, which is preset based on a parameter value.

Here, the parameter value may be resistance values of the parasitic resistor Rg input and stored by the current detection circuit 100. The controller 200 may select the resistance value of the parasitic resistor Rg corresponding to the current detection circuit 100 among the stored resistance values of the parasitic resistor Rg, and determine the steering assist current value Imotor from the steering assist voltage value Vout.

The controller 200 may calculate the steering assist current value Imotor from the steering assist voltage value Vout using Equation 1 below.

$$V_o = R_{d2} \frac{(R_s + R_g + R_o + R_2)V_{cc} + R_{d1}(R_s + R_g)I_{motor}}{(R_s + R_g + R_o + R_2)(R_{d1} + R_{d2}) + R_{d1}R_{d2}}$$ [Equation 1]

$$V_{out} = \frac{R_1 + R_f}{R_1(R_o + R_2)} \left\{ \left( R_o(R_s + R_g) - \frac{(R_s + R_g)^2 R_o}{R_s + R_g + R_o + R_2} \right) I_{motor} + \left( R_2 + \frac{R_o(R_s + R_g)}{R_s + R_g + R_o + R_2} \right) V_o \right\} - \frac{R_f R_g}{R_1} \left( I_{motor} - \frac{(R_s + R_g)I_{motor} - V_o}{R_s + R_g + R_o + R_2} \right)$$

Hereinafter, it will be described a process of calculating a steering assist current value by an electronic control device using the current detection circuit 100 of the present embodiment.

When measuring current through a shunt resistor Rs, it is a general method to take a small resistance value in order to reduce the effect of the resistance on temperature.

The operational amplifier 110 may be used to amplify again according to the side in which a small voltage range is to be measured. Since a range of the voltage and a resolution available for the analog-to-digital conversion (ADC) of the controller are fixed, in order to increase the effective resolution of the value to be used in the software, an amplification ratio of the operational amplifier 110 may be designed in consideration of an operating current range and the effect of temperature.

In addition, in the case that it is required to measure a bidirectional current, a separate voltage divider circuit may be added to apply an offset voltage Vo.

In the case of the operational amplifier 110 used as an amplifier, as shown in FIG. 3, an amplification ratio may be determined through a ratio between the fourth resistor Rf and the third resistor R1.

The mathematical properties for this are as shown in Equation 2 below.

[Equation 2]

$I_2$ Current (KCL);

$$\frac{V_o - V_{op+}}{R_o} = \frac{V_{op+} - V_{2|}}{R_2} \quad (1)$$

$$V_{op+} = \frac{R_2 V_o + R_o V_2}{R_o + R_2} \quad (2)$$

$I_1$ current (KCL);

$$\frac{V_{out} - V_{op-}}{R_2} = \frac{V_{op-} - V_1}{R_1} \quad (3)$$

$$V_{out} = V_{op-}\left(1 + \frac{R_2}{R_1}\right) - \frac{R_f}{R_1}V_1 \quad (4)$$

Since a voltage of the positive input terminal Vop+ and a voltage of the negative input terminal Vop− of the operational amplifier 110 are the same in a steady state, equations such as (1) to (4) in Equation 2 may be established according to Kirchhoff's law.

The output of the operational amplifier 110 may be determined by (5) in Equation 3 below.

[Equation 3]

$$V_{out} = \left(\frac{R_2 V_o + R_o V_2}{R_o + R_2}\right)\left(\frac{R_1 + R_f}{R_1}\right) - \frac{Rf}{R_1}V_1 \quad (5)$$

In the case of a circuit design using the same passive element, if the first resistor R2, the third resistor R1, the second resistor R0 and the fourth resistor Rf are set to the same value for simplicity, it may be (6) of Equation 4 below.

[Equation 4]

$$V_{out} = |V_o + \frac{Rf}{R_1}(V_2 - V_1) \quad (6)$$

Shunt Resistor and Voltage Divider

In order to construct a circuit for measuring the bidirectional current flowing through the steering motor 20, if a shunt resistor Rs amplifying the voltage is placed between the V2 and V1 terminals of FIG. 3, there may be provided a circuit as shown in FIG. 4.

The entire circuit may be configured in consideration of an input voltage range of the controller 200, an amplification ratio of the operational amplifier 110, and the operating current. In particular, if it is required to measure a bidirectional current, an offset voltage of the output of the operational amplifier 110 may be set by adding a voltage divider circuit through a resistor to the Vo stage.

In this case, an effective circuit of a portion corresponding to the offset voltage Vo in a steady state may be expressed as shown in FIG. 5.

Since the offset voltage Vo is not distributed only with the power supply voltage Vcc and the two resistor values, the offset voltage Vo as in (10) of Equation 5 may be obtained by arranging the entire circuit of FIG. 5.

[Equation 5]

$$i_1 = I_{motor}, V_o = R_{d2}(i_2 - i_3), V_{s+} = R_s(i_1 - i_2) \quad (7)$$

$$R_s(i_1 - i_2) + (R_o + R_2)i_2 + V_o = 0 \quad (8)$$

$$R_{d1}i_3 = V_o - V_{cc} \quad (9)$$

$$V_o = R_{d2}\frac{(R_s + R_o + R_2)V_{cc} + R_{d1}R_s I_{motor}}{(R_s + R_o + R_2)(R_{d1} + R_{d2}) + R_{d1}R_{d2}} \quad (10)$$

Since the steering assist current value Imotor to be measured affects the offset voltage Vo, if the offset voltage Vo is obtained by simply considering the voltage distribution component by the power supply voltage Vcc and the resistors without the entire circuit, there may occur an error due to a change in the offset voltage Vo.

As in Equation 6, the offset voltage Vo may be proportional to the resistance value of the shunt resistor Rs.

If a voltage across the shunt resistor Rs is developed in the same way, it can be expressed as (11) to (14) in Equation 6 below.

The Vs+ may also be affected by the offset voltage Vo, that is, the power supply voltage Vcc.

[Equation 6]

$$i_1 = I_{motor}, V_o = R_{d2}(i_2 - i_3), V_{s+} = R_s(i_1 - i_2) \quad (11)$$

$$R_s(i_1 - i_2) + (R_o + R_2)i_2 + R_{d2}(i_2 - i_3) = 0 \quad (12)$$

$$R_{d2}(i_3 - i_2) + R_{d1}i_3 + V_{cc} = 0 \quad (13)$$

$$V_{s+} = R_s\left(I_{motor} + \frac{R_{d2}V_{cc} - (R_{d1} + R_{d2})R_s I_{motor}}{(R_s + R_o + R_2)(R_{d1} + R_{d2}) + R_{d1}R_{d2}}\right) \quad (14)$$

If the obtained offset voltage Vo of Equation 5 and the steering assist voltage Vs+ of Equation 6 are substituted into the overall output equation of the operational amplifier 110, a voltage value Vout can be obtained as shown in (15) of Equation 7.

[Equation 7]

$$V_{out} = \left(\frac{R_2 V_o + R_o + V_{s+}}{R_o + R_2}\right)\left(\frac{R_1 R_f}{R_1}\right) = \quad (15)$$

$$\left[\frac{\{R_{d1}R_{d2} + R_o(R_{d1} + R_{d2})\}R_s I_{motor} + R_{d2}(R_2 + R_s)V_{cc}}{(R_s + R_o + R_2)(R_{d1} + R_{d2}) + R_{d1}R_{d2}}\right]\left\{\frac{R_1 + R_f}{R_1}\right\}$$

Here, since a magnitude of the shunt resistor Rs used compared to the current desired to be measured is relatively small, as shown in Equation 8, this effect is generally ignored and only the portion corresponding to the offset voltage Vo may include a constant offset voltage Vo value according to the ratio of the voltage divider circuit as a constant.

In this case, an error component between the measuring unit current and the offset circuit may be included, thereby causing a problem in which an actual value cannot be measured.

[Equation 8]

$$V_{out} = V_o + \frac{R_f}{R_1}V_{s+} = V_{cc}\frac{R_{d2}}{R_{d1} + R_{d2}} + \frac{R_f}{R_1}I_{motor}R_s \quad (16)$$

Isolation by Buffer

As a method for reducing the effect on the error in an embodiment, as shown in FIG. 6, a buffer 120 constituting an operational amplifier having an amplification ratio of 0 may be included between the second resistor R0 and the first voltage distribution resistor Rd1 and the second voltage division resistor Rd2, thereby securing the independence between circuits.

Although this configuration can prevent current from flowing from the current measuring unit to the offset voltage divider stage, it cannot be a perfect solution since it cannot prevent the current flowing from the offset voltage to the shunt resistor Rs, and there may provide improvements in terms of reducing the impact of a portion.

As shown in FIG. 7, the configuration of the effective circuit including the offset voltage Vo part may be analyzed by separating the part included up to the power supply voltage Vcc into the second resistor R0. However, there may not exclude the node of the portion connected to the ground from the second resistor R0 via the shunt resistor Rs.

Considering the difference in the numerical part, the final output of the buffer 120 may be obtained as shown in (17) of Equation 9.

There may be a method of securing bi-directional isolation by increasing circuit complexity, but in the case of mass-produced products, adding circuits may be disadvantageous in terms of cost, and increasing the number of devices may be also disadvantageous in terms of failure rate.

Therefore, there may be advantageous to apply the software to a product by increasing the complexity of the software while minimizing the addition of circuits.

[Equation 9]

$$V_o = \frac{R_{d2}}{R_{d1} + R_{d2}} V_{cc}, \quad V_{s-} = V_1 = 0, \quad V_{s+} = V_2 \quad (17)$$

$$R_s(i_1 - i_2) + (R_o + R_2)i_2 + V_o = 0 \quad (18)$$

$$(R_s + R_o + R_2)i_2 = R_s I_{motor} - V_o \quad (19)$$

$$i_2 = \frac{R_s I_{motor} - V_o}{R_s + R_o + R_2} \quad (20)$$

$$V_{s+} = R_s I_{shunt} = R_s \left( I_{motor} - \frac{R_s I_{motor} - V_o}{R_s + R_o + R_2} \right) \quad (21)$$

Error Due to Parasitic Resistance

Even if the controller 200 converts the steering assist voltage value into the steering assist current value during circuit design, if an unintended parasitic resistance occurs due to a problem in PCB design or manufacturing, there may occur an error in the simplified formula.

For example, there may be a case in which parasitic resistor Rg is generated in the ground stage. Hereinafter, it will be described a process of calculating the steering assist current value in this case.

If the parasitic resistor Rg or a parasitic resistance occurs between the shunt resistance Rs and the ground, the offset voltage Vo and the steering assist voltage value Vout may be obtained as shown in (23) and (24) of Equation 10.

[Equation 10]

$$V_o = R_{d2} \frac{(R_s + R_g + R_o + R_2)V_{cc} + R_{d1}(R_s + R_g)I_{motor}}{(R_s + R_g + R_o + R_2)(R_{d1} + R_{d2}) + R_{d1}R_{d2}} \quad (23)$$

-continued $$V_{out} = \left[ \frac{\{R_{d1}R_{d2} + R_o(R_{d1} + R_{d2})\}(R_s + R_g)I_{motor} + R_{d2}(R_2 + R_s + R_g)V_{cc}}{(R_s + R_g + R_o + R_2)(R_{d1} + R_{d2}) + R_{d1}R_{d2}} \right] \left( \frac{R_1 + R_f}{R_1} \right) - \frac{R_f R_g}{R_1} \frac{(R_o + R_2)(R_{d1} + R_{d2})I_{motor} + R_{d1}R_{d2}I_{motor} + R_{d2}V_{cc}}{(R_s + R_g + R_o + R_2)(R_{d1} + R_{d2}) + R_{d1}R_{d2}} \quad (24)$$

In the case of the circuit configured as shown in Table 1, the effect of the shunt resistor Rs on the parasitic resistor Rg may be expressed as shown in FIG. 9.

That is, in the case that a component of the parasitic resistor Rg is not considered, there may occur an error of up to about 5 A when a current of 100 A flows.

TABLE 1

| Part | Value | Unit |
|------|-------|------|
| Vcc  | 5     | V    |
| Rd1  | 12,000 | Ohm |
| Rd2  | 4,300 | Ohm  |
| Ro   | 10,000 | Ohm |
| Rf   | 10,000 | Ohm |
| R1   | 514   | Ohm  |
| R2   | 514   | Ohm  |
| Rs   | 0.002 | Ohm  |
| Rg   | 0.009 | Ohm  |

An accurate steering assist current value Imotor may be obtained by inverse calculation based on the steering assist voltage value Vout of Equation 10, and the final output may be as shown in Equation 1.

FIG. 10 is a circuit diagram in which a parasitic resistor Rg is applied to a current detection circuit 100 and a buffer 120 is applied to an offset voltage.

According to the electronic control device using such a current detection circuit, it is possible to accurately control an inverter 30 by determining a steering assist current value Imotor from a steering assist voltage value Vout based on an input/output relational expression of an operational amplifier 110 and a resistance values of the shunt resistor Rs and a parasitic resistor Rg.

Parasitic Resistance in PCB Manufacturing

The above example may correspond to a case due to a problem in the ground pattern or a parasitic resistor between the ground of the system and the shunt resistance Rs. Alternatively, there may be cases in which a parasitic resistance is included between a reference ground used by the controller 200 and a ground on the measurement circuit due to the instability of the ground terminal, and the equation for this case may be as shown in Equation 1.

Error Due to Distribution of Elements

Since various devices are configured as a circuit for measuring current, there may occur an error in measurement current accuracy due to an error according to a manufacturing distribution of each device.

The measurement error due to distribution may be usefully used to select a necessary device according to target control accuracy during design.

In the case of configuring a circuit having a distribution as shown in Table 2, an expected maximum error range may be derived as shown in FIG. 11.

TABLE 2

| Part | Value | Unit | Tolerance |
|------|-------|------|-----------|
| Vcc | 5 | V | 10% |
| Rd1 | 12,000 | Ohm | 1% |
| Rd2 | 4,300 | Ohm | 1% |
| Ro | 10,000 | Ohm | 1% |
| Rf | 10,000 | Ohm | 1% |
| R1 | 514 | Ohm | 0.50% |
| R2 | 514 | Ohm | 0.50% |
| Rs | 0.002 | Ohm | 1% |

According to an embodiment of the present disclosure, the controller 200 may determine a steering assist current value Imotor from a steering assist voltage value Vout based on an input/output relational expression of an operational amplifier 110 and a resistance values of the shunt resistor Rs and a parasitic resistor Rg, thereby accurately controlling an inverter 30.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. An electronic control device using a shunt resistor and a current detection circuit comprising:
    an inverter configured to convert electric energy of a battery to provide a steering assist current to a steering motor;
    a shunt resistor connected between the inverter and a ground to form a steering assist voltage corresponding to the steering assist current;
    a current detection circuit including an operational amplifier for amplifying and outputting the steering assist voltage and a parasitic resistor generated between the shunt resistor and the ground; and
    a controller configured to convert a steering assist voltage value amplified by the current detection circuit into a steering assist current value and control the inverter by using a driving signal output according to the converted steering assist current value,
    wherein the controller is configured to determine the steering assist current value from the steering assist voltage value based on an input/output relational expression of the operational amplifier and resistance values of the shunt resistor and the parasitic resistor.

2. The electronic control device of claim 1, wherein the controller determines the steering assist current value from the steering assist voltage value according to the resistance value of the parasitic resistor, which is preset based on a parameter value.

3. The electronic control device of claim 1, wherein the current detection circuit comprises a first resistor connected between one end of the shunt resistor and a positive input terminal of the operational amplifier.

4. The electronic control device of claim 3, wherein the current detection circuit comprises a second resistor connected between the positive input terminal of the operational amplifier and a power supply voltage.

5. The electronic control device of claim 4, wherein the current detection circuit comprises a first voltage distribution resistor connected between the second resistor and the power supply voltage.

6. The electronic control device of claim 5, wherein the current detection circuit comprises a second voltage distribution resistor connected between the second resistor and the ground.

7. The electronic control device of claim 6, wherein the current detection circuit comprises a third resistor connected between the other end of the shunt resistor and a negative input terminal of the operational amplifier.

8. The electronic control device of claim 7, wherein the detection circuit comprises a fourth resistor current connected between the negative input terminal and an output terminal of the operational amplifier.

9. The electronic control device of claim 8, wherein the current detection circuit comprises a buffer connected between the second resistor and the first voltage distribution resistor and the second voltage distribution resistor.

10. The electronic control device of claim 9, wherein the controller determines the steering assist current value from the steering assist voltage value by using the following equation $$V_o = R_{d2} \frac{(R_s + R_g + R_o + R_2)V_{cc} + R_{d1}(R_s + R_g)I_{motor}}{(R_s + R_g + R_o + R_2)(R_{d1} + R_{d2}) + R_{d1}R_{d2}}$$

$$V_{out} = \frac{R_1 + R_f}{R_1(R_o + R_2)} \left\{ \left( R_o(R_s + R_g) - \frac{(R_s + R_g)^2 R_o}{R_s + R_g + R_o + R_2} \right) I_{motor} + \left( R_2 + \frac{R_o(R_s + R_g)}{R_s + R_g + R_o + R_2} \right) V_o \right\} - \frac{R_f R_g}{R_1} \left( I_{motor} - \frac{(R_s + R_g)I_{motor} - V_o}{R_s + R_g + R_o + R_2} \right).$$

* * * * *